United States Patent Office 3,121,715
Patented Feb. 18, 1964

3,121,715
PRODUCTION OF N-BROMINATED ORGANIC COMPOUNDS
Thomas D. Waugh, 3737 Broadway, and Richard C. Waugh, 3615 Broadway, both of Boulder, Colo.
No Drawing. Filed May 10, 1957, Ser. No. 658,233
10 Claims. (Cl. 260—248)

This invention relates to production of certain types and classes of N-brominated organic nitrogen compounds and this application is a continuation-in-part of our application Serial No. 487,474, filed April 10, 1955 (now abandoned), which is a continuation-in-part of our application Serial No. 214,019, filed March 5, 1951 (now forfeited), and related to our application Serial No. 524,822, filed July 27, 1955 (now abandoned), a continuation-in-part of Serial No. 487,474.

More specifically, this invention relates to the production of N-brominated organic compounds from the N-hydrogen compounds consisting of aliphatic and aromatic cyclic imides, aliphatic amides, aromatic sulfonamides, hydantoins, melamine and cyanuric acid.

Procedures previously employed for the production of N-brominated organic compounds by the bromination of N-hydrogen organic compounds, except for the procedures of our aforesaid applications, have generally given low yields or impure products, or both, and particularly have been exceedingly wasteful of bromine. In general, N-brominated organic compounds have been prepared by the treatment of a corresponding N-hydrogen organic compound in aqueous medium with molecular bromine in the presence of a strong base, or with alkali hypobromite prepared separately by treatment of molecular bromine with a strong base, as in accordance with the following Equation I, wherein R represents an organic radical and R' represents an organic radical or hydrogen, while R and R' may be joined together, as in a ring structure.

(I)

As will be evident from the above equation, only one-half of the bromine used becomes incorporated in the desired N-brominated compound, the other half being converted into a by-product alkali bromide, from which it can be recovered only by special techniques, generally limited to large scale operations. Also, the N-brominated compound thus obtained is usually contaminated with alkali bromide, unless large quantities of water are employed to dissolve and wash away the equimolecular quantities of alkali bromide formed along with the N-brominated product. Such use of large quantities of water often results in descreased yield of the desired product.

Among the objects of the present invention are to provide an improved method for the production of N-brominated organic compounds from certain N-hydrogen organic compounds, particularly aliphatic and aromatic cyclic imides, aliphatic amides, aromatic sulfonamides, hydantoins, melamine and cyanuric acid; to provide such a method which is highly efficient and particularly enables the bromine used in such bromination to enter into the bromination reaction to a substantially maximum extent; to provide such a method which can be made to produce comparatively high yields as well as to produce the desired product in a comparatively high state of purity; and to provide such a method which may be carried out with comparative ease.

Additional objects and the novel features of this invention will become apparent from the description which follows.

In accordance with the present invention, an N-brominated organic compound is produced by reacting bromine with one of the above N-hydrogen organic compounds in an alkaline or basic solution, and in the presence of a chloro agent, i.e., either chlorine or the corresponding N-chloro organic compound. The chlorine may be supplied in the form of molecular chlorine, or may be supplied by an alkali hypochlorite, such as NaOCl, which also may produce the desired alkalinity of the solution. The following Equations II, III and IV represent the possible reactions, wherein R and R' have the same meaning as previously.

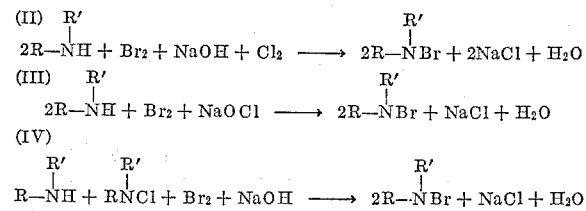

As will be evident from the above equations, all of the bromine is made available from bromination of the N-hydrogen organic compound, whereas in the prior process of Equation I, only one-half of the bromine is made available.

As will be evident from a comparison of Equation I with Equations II, III and IV, there is no NaBr on the right hand side of the latter, while an equimolecular quantity of NaBr is produced in Equation I. An unexpected result of the use in alkaline solution of molecular chlorine, an alkali hypochlorite, or of the corresponding N-chloro compound, lies in the lack of production of an alkali bromide, which is difficult to separate from the N-brominated organic compound and also represents a waste of bromine, whereas the NaCl or alkali chloride produced in Equations II, III and IV is not at all difficult to separate. Also, while the alkali bromide produced in Equation I could be treated to recover the bromine for reuse, one-half of the bromine so recovered would not be utilized in such reuse.

A completely unexpected result of the use of the corresponding N-chloro organic compound lies in the fact that attempts to brominate the corresponding N-chloro compound, alone and independent of the reaction of Equation IV, have met with little success. Thus, although some substitution of bromine for chlorine apparently took place, no substantially brominated product was produced. In view thereof, it appears probable that the simultaneous reaction of bromine with the N-hydrogen compound in basic solution has a promoting effect, whether catalytic or of some other nature being unknown. As will also be evident from Equations II and III, the high yields produced when elemental chlorine or alkali hypochlorite was added to the reaction mixture, without the ultimate production of the corresponding N-chloro organic compound (although the N-hydrogen organic compound was available for reaction with chlorine), may be explained by the reaction of Equation IV. Thus, it is possible that with the use of chlorine or alkali hypochlorite, the corresponding N-chloro organic compound is produced, but is converted to the corresponding N-bromo organic compound, as through the reaction of Equation IV. Therefore, it is also an unexpected result that the N-chloro compound was not produced, particularly in the reactions of Equations II and III. It will be noted, of course, that in the reactions of Equations II, III and IV, the bromination is selective and on the nitrogen atoms, but this selectivity appears to be unpredictable, since of the numerous compounds tested for the reaction, such selectivity has been found only in the case of the types of imides, amides, hydantoins and sulfonamides, specified hereinbefore, as well as melamine and cyanuric acid.

The following examples will serve to illustrate specific applications of the method of this application, but are not to be construed as limiting the same.

*Example 1*

[Use of $Cl_2$ in basic solution in the production of N-bromosuccinimide]

To a solution of 0.808 mole of succinimide and 0.808 mole of NaOH dissolved in 150 cc. of water at 10° C. was added dropwise 0.444 mole of bromine (55% of the theoretical quantity required by prior processes). After all of the bromine had been added, the mixture was a rather thick white slurry showing no yellow or orange color. Gaseous chlorine was bubbled into the slurry until a yellow-orange color developed. The product was filtered, washed well with water, and dried. The yield obtained was 117 g. of cream colored powder identified as N-bromosuccinimide, amounting to 81.8% of the theoretical.

*Example 2*

[Use of $Cl_2$ in basic solution in the production of N-bromosuccinimide]

To a solution of 40 g. (0.4 mole) of succinimide in 160 ml. of water at 20° C. was added a cooled solution of 16 g. (0.4 mole) of NaOH in 20 ml. of water. The solution was cooled to 5° C. and bromine (10.5 ml., 0.2 mole) was added during 18 minutes, maintaining the temperature below 10° C. Then 14.2 g. (0.2 mole) of chlorine was added during 15 minutes; the mixture was stirred for an additional hour. The product was filtered, washed with ice water, dried at 60° C. and identified as N-bromosuccinimide. It weighed 58 g. (82% of the theoretical amount), contained 45.2% active bromine, compared with the 44.9% required by the formula $C_4H_4BrNO_2$, and melted at 173–178° C. with decomposition.

*Example 3*

[Use of N-chlorosuccinimide in basic solution in the production of N-bromosuccinimide]

To a mixture of 40 g. (0.4 mole) succinimide, 14 g. (0.35 mole) of sodium hydroxide, 48 g. (0.36 mole) of N-chlorosuccinimide and 190 ml. of water at 7° C. was added 20.5 ml. (0.4 mole) of bromine during 55 minutes. The mixture was stirred for 18 hours while the temperature rose to 22° C. After being cooled to 5° C., the product was filtered, washed with ice water, and dried at 60° C. The product, identified as N-bromosuccinimide, weighed 104 g. (77% of the theoretical amount) and contained 45.4% active bromine, compared with 44.9% required by the formula $C_4H_4O_2NBr$. It melted at 173–175° C.

*Example 4*

[Use of NaOCl in the production of N-bromosuccinimide]

To a solution of 40 g. (0.4 mole) of succinimide, 20 g. (0.2 mole) of sodium hypochlorite, and 390 ml. of water at 12° C., was added 10.3 ml. (0.2 mole) of bromine during 4 minutes. The mixture was stirred for 4.5 hours at 6° C. and filtered. The filter cake was washed with cold water and stirred with 100 ml. of ice water for 1 hour. The product was filtered, washed with ice water, dried at 60° C., and identified as N-bromosuccinimide. It weighed 47 g. (66% of the theoretical amount), contained 45.8% active bromine, compared with 44.9% required by the formula $C_4H_4O_2NBr$, and melted at 175–176° C.

*Example 5*

[Use of $Cl_2$ in basic solution in the production of N-bromophthalimide]

To a solution of 16 g. (0.4 mole) of NaOH in 200 ml. of water at 10° C. was added 58.8 g. (0.4 mole) of phthalimide and the mixture was cooled to 5° C. Then 10.5 ml. (0.2 mole) of bromine was added during 14 minutes, maintaining the temperature below 10° C. 14.2 g. (0.2 mole) of chlorine was then bubbled into the mixture during 15 minutes; the mixture was stirred for an additional hour. The product was filtered, washed with ice water, dried at 60° C. and identified as N-bromophthalimide. It weighed 78 g. (85% of the theoretical yield), contained 32.4% active bromine compared with the 35.3% required by the formula $C_8H_4BrNO_2$, and melted at 181–191° C. with decomposition.

*Example 6*

[Use of $Cl_2$ in basic solution in the production of N-bromoacetamide]

To a solution of 36 g. (0.6 mole) of acetamide in 40 ml. of water was added a cooled solution of 24 g. (0.6 mole) of NaOH in 50 ml. of water. The solution was cooled to 2° C. and 15 ml. (0.3 mole) of bromine was added during 20 minutes, maintaining the temperature below 10° C. Then, 21.3 g. (0.3 mole) of chlorine was bubbled into the mixture during 25 minutes. The product was filtered, washed with ice water, dried at room temperature, and identified as N-bromoacetamide. It weighed 21.5 g. (26% of the theoretical amount), contained 56.0% active bromine, compared with the 57.8% required by the formula $C_2H_4NOBr$, and melted at 70°–85° C.

*Example 7*

[Use of N-chloroacetamide in basic solution in the production of N-bromoacetamide]

To a solution of 12 g. (0.2 mole) of acetamide and 8 g. (0.2 mole) of NaOH in 30 ml. of water at 5° C., was added 10 ml. (0.2 mole) of bromine during 20 minutes. Then 18.5 g. (0.2 mole) of N-chloroacetamide was added, and the mixture was stirred for 5.5 hours at 5° C. The product was filtered, washed with a small amount of ice water, and dried at room temperature. The product, identified as N-bromoacetamide, weighed 36 g. (65% of the theoretical amount), contained 55.3% active bromine, compared with 57.9% required by the formula $$C_2H_4ONBr$$

and melted at 80–95° C.

*Example 8*

[Use of $Cl_2$ in basic solution in the production of 1,3-dibromo-5-ethyl-5-methylhydantoin]

To a solution of 16 g. (0.4 mole) of NaOH in 250 ml. of water at 10° C. was added 28.4 g. (0.2 mole) of 5-ethyl-5-methylhydantoin. The solution was cooled to 5° C., followed by the addition of 10.5 ml. (0.2 mole) of bromine during 13 minutes, maintaining the temperature below 10° C. Then, 14.2 g. (0.2 mole) of chlorine was bubbled into the mixture during 18 minutes. The mixture was stirred for an additional hour. The product was filtered, washed with ice water, and dried at room temperature. The product was identified as 1,3-dibromo-5-ethyl-5-methylhydantoin. It weighed 33 g. (55% of the theoretical amount), contained 53.4% active bromine, compared with the 53.3% required by the formula $C_6H_8O_2N_2Br_2$, and melted at 110–112° C.

*Example 9*

[Use of chlorine in solution made basic by CaO in the production of 1,3-dibromo-5,5-dimethylhydantoin]

To 200 ml. of water were added 25 g. (0.4 mole) of calcium oxide, 51 g. (0.4 mole) of dimethylhydantoin, and ice to produce a temperature of −2° C. Then, 21 ml. (0.4 mole) of bromine was added during 20 minutes, with the temperature rising to 12° C. The mixture was cooled to 0° C. and 28.5 g. (0.4 mole) of chlorine was bubbled into it during 25 minutes. The product was filtered, washed with ice water, and dried at 60° C. The product, identified as 1,3-dibromo-5,5-dimethylhydantoin, weighed 106 g. (93% of the theoretical amount), contained 55.2% active bromine compared with the 55.9% required by the formula $C_5H_6O_2N_2Br_2$, and melted with decomposition at 195° C.

Example 10

[Use of chlorine in solution made basic by Na₂CO₃ in the production of 1,3-dibromo-5,5-dimethylhydantoin]

To 200 ml. of water were added 45 g. (0.42 mole) of sodium carbonate and ice to produce a temperature of 20° C., followed by 51 g. (0.4 mole) of dimethylhydantoin and ice to produce a temperature of —5° C. Then, 21 ml. (0.4 mole) of bromine was added during 22 minutes, maintaining the temperature below 10° C. 28.5 g. (0.4 mole) of chlorine was then bubbled into the mixture over a period of 42 minutes. The product was filtered, washed with ice water, and dried at 60° C. The product, identified as 1,3-dibromo-5,5-dimethylhydantoin, weight 108 g. (95% of the theoretical amount), contained 55.7% active bromine, compared with the 55.9% required by the formula $C_5H_6O_2N_2Br_2$, and melted with decomposition at 190° C.

Example 11

[Use of 1,3-dichloro-5,5-dimethylhydantoin in basic solution in the production of 1,3-dibromo-5,5-dimethylhydantoin]

To 200 ml. of water were added 32 g. (0.8 mole) of sodium hydroxide and ice to produce a temperature of 0° C., followed by 51 g. (0.4 mole) of dimethylhydantoin and ice to produce a temperature of —4° C. Then, 42 ml. (0.82 mole) of bromine was added during 35 minutes, maintaining the temperature below 10° C. 65 g. (0.33 mole) of 1,3-dichloro-5,5-dimethylhydantoin was added and the mixture was stirred for 18 hours, while the temperature rose to 25° C. The product was filtered, washed with cold water, and dried at 60° C. The product, identified as 1,3-dibromo-5,5-dimethylhydantoin, weighed 197 g. (94% of the theoretical amount), contained 55.3% active bromine, compared with the 55.9% required by the formula $$C_5H_6O_2N_2Br_2$$

and melted with decomposition at 189° C.

Example 12

[Use of Cl₂ in basic solution in the production of monobromo-5,5-dimethylhydantoin]

To 400 ml. of water were added 32 g. (0.8 mole) of NaOH, 1.2 g. (0.01 mole) of Na₂CO₃ and ice to cool to 10° C., followed by 104.8 g. (0.82 mole) of dimethylhydantoin and ice to cool to —3° C. 21 ml. (0.42 mole) of bromine was added during 10 minutes, maintaining the temperature below 10° C. Then, 29.4 g. (0.42 mole) of chlorine was bubbled into the mixture during 30 minutes. The product was filtered, washed with ice water, and dried at 60° C. The product, identified as monobromo-5,5-dimethylhydantoin, weighed 154 g. (91% of the theoretical amount), contained 38.5% active bromine, compared with the 38.6% required by the formula $C_5H_7O_2N_2Br$, and melted with decomposition at 166°–168°.

Example 13

[Use of N,N-dichlorobenzenesulfonamide in basic solution in the production of N,N-dibromobenzenesulfonamide]

To a solution of 15.7 g. (0.1 mole) of benzenesulfonamide, 8 g. (0.2 mole) of sodium hydroxide, and 200 ml. of water at 6° C. was added 10.5 ml. (0.2 mole) of bromine during 15 minutes. Then, 22.6 g. (0.1 mole) of N,N-dichlorobenzenesulfonamide was added and the mixture was stirred for 6 hours. The product was filtered, washed with ice water, and dried at room temperature. The product, identified as N,N-dibromobenzenesulfonamide, weighed 55 g. (87% of the theoretical amount), contained 52.1% active bromine, compared with the 50.8% required by the formula $C_6H_5SO_2NBr_2$, and melted at 107–108° C. with decomposition.

Example 14

[Use of Cl₂ in basic solution in the production of N-brominated cyanuric acid]

To a solution of 6 g. (0.15 mole) of NaOH in 250 ml. of water at 15° C. was added 6.5 g. (0.05 mole) of cyanuric acid. The resulting solution was cooled to 9° C. During 5 minutes, 4.4 ml. (0.086 mole) of bromine was added, maintaining the temperature below 10° C. and the mixture was then stirred for 10 minutes. Then, during 6 minutes, 5.3 g. (0.075 mole) of chlorine was bubbled in. The mixture was filtered, washed with ice water and dried at room temperature. The product, identified as N-brominated cyanuric acid, weighed 20 g., contained 46.8% active halogen, and did not melt below 310° C.

Example 15

[Use of Cl₂ in basic solution in the production of tribromomelamine]

To a solution of 12 g. (0.3 mole) of NaOH in 400 ml. of water at 10° C. was added 12.6 g. (0.1 mole) of melamine. The resulting mixture was cooled to 5° C. During 20 minutes, 8 ml. (0.15 mole) of bromine was added, maintaining the temperature below 10° C. Then, 10.5 g. (0.15 mole) of chlorine was bubbled into the mixture during 11 minutes. After 15 minutes of stirring, the product was filtered, washed with ice water, and dried at room temperature. The product, identified as tribromomelamine, weighed 33 g. (92% of the theoretical amount), contained 65.8% active bromine, compared with the 66.1% required by the formula $$C_3H_3Br_3N_6$$

and did not melt below 310° C.

Example 16

[Use of Cl₂ in basic solution in the production of hexabromomelamine]

To a solution of 26 g. (0.65 mole) of NaOH in 400 ml. of water at 15° C. was added 13.6 g. (0.108 mole) of melamine; the resulting mixture was cooled to 9° C. and 19 ml. (0.37 mole) of bromine was added during 30 minutes, maintaining the temperature below 10° C. Then, 22.7 g. (0.32 mole) of chlorine was bubbled into the mixture during 25 minutes. The mixture was filtered and sucked dry; the filter cake was slurried in 150 ml. of ice water, again filtered, and then dried at room temperature. The product, identified as hexabromomelamine, weighed 58 g. (89% of the theoretical amount), contained 79.5% active bromine, compared with the 80.0% required by the formula $C_3Br_6N_6$, and on heating in a capillary tube, exploded at 140° C.

In addition to the above examples, a basic aqueous solution and Cl₂ have been used with bromine in the production of N,N-dibromobenzenesulfonamide from benzenesulfonamide. It will be noted that in some examples, the bromine is added to a solution of the N-hydrogen organic compound in water, along with other reagents, while in other examples the bromine is added to a mixture of the N-hydrogen compound, water and other constituents. The latter indicates that the N-hydrogen compound is sparingly soluble in water or perhaps almost insoluble. Nevertheless, it was found that with stirring and particularly when the N-hydrogen compound was present in relatively finely divided form, the various reactions proceeded as indicated, despite the low solubility of the N-hydrogen compound in water. Thus, when it is stated herein, as in the appended claims, that an N-hydrogen compound is treated with bromine in an aqueous solution or in a basic aqueous solution, it will be understood that the N-hydrogen compound does not necessarily have to be homogenously dissolved in the solution, although it may be partially or even substantially wholly dissolved therein. It will be noted, of course, that agents such as NaOH and other bases, as well as NaOCl and other hypochlorites, are normally soluble in water, so that such reagents would normally be in aqueous solution.

In addition to the specific conditions described above, the invention may in many instances be carried out at other temperatures, such as from the freezing point of the solution to room temperature. For example, it is preferred to carry out the reaction at from 0° C. to 100° C., in the production of N-bromosuccinimide and N-bromoacetamide.

What is claimed is:

1. A method of producing an N-brominated organic compound from an N-hydrogen organic compound selected from the group consisting of succinimide, phthalimide, acetamide, 5,5-di-lower alkyl hydantoins, benzene sulfonamide, melamine and cyanuric acid which comprises treating said N-hydrogen compound with bromine in a basic aqueous solution and introducing therein a chloro agent selected from the group consisting of chlorine, an alkali hypochlorite and the corresponding N-chloro organic compound.

2. A method according to claim 1, wherein the N-hydrogen organic compound is succinimide.

3. A method according to claim 1, wherein the N-hydrogen organic compound is acetamide.

4. A method according to claim 1, wherein the N-hydrogen organic compound is benzene sulfonamide.

5. A method according to claim 1, wherein the N-hydrogen organic compound is melamine.

6. A method according to claim 1, wherein the N-hydrogen organic compound is 5,5-dimethylhydantoin.

7. A method according to claim 1, wherein the N-hydrogen organic compound is cyanuric acid.

8. A method according to claim 1, wherein the N-hydrogen organic compound is phthalimide.

9. A method according to claim 1, wherein the N-hydrogen organic compound is 5-ethyl-5-methylhydantoin.

10. A method of preparing an N-brominated compound from an N-hydrogen compound of the group consisting of succinimide, phthalimide, acetamide, 5-alkyl-substituted hydantoins, monocyclic hydrocarbonaryl sulfonamides, melamine and cyanuric acid which comprises treating said N-hydrogen compound in aqueous medium with chlorine in the presence of bromine and an inorganic alkaline material in amount sufficient to give an alkaline pH.

References Cited in the file of this patent

UNITED STATES PATENTS

| 2,013,791 | Sachs et al. | Sept. 10, 1935 |
| 2,184,888 | Muskat et al. | Dec. 26, 1939 |
| 2,472,361 | Arsem | June 7, 1949 |
| 2,495,489 | Andel | Jan. 24, 1950 |
| 2,779,764 | Paterson | Jan. 29, 1957 |

OTHER REFERENCES

Chattaway et al: Journal of the Chemical Society, vol. 81, pp. 200–202, 1902.

Zmaczynski: Deutsche Chemische Gesellschaft Berichte, vol. 59, pp. 710–711, 1926.

Houben: Die Methoden der Org. Chem., vol. 3, p. 1146, 1943.

Orazi: Chemical Abstracts, vol. 48, col. 13634, 1954.